United States Patent
Loeffler

(10) Patent No.: US 8,788,105 B2
(45) Date of Patent: Jul. 22, 2014

(54) METHOD OF AUTOMATIC HYDRAULIC EQUALIZATION IN A FLUID-FLOW SYSTEM

(75) Inventor: Gerhard Loeffler, Olsberg (DE)

(73) Assignee: Oventrop GmbH & Co. KG, Olsberg (DE)

( * ) Notice: Subject to any disclaimer, the term of this patent is extended or adjusted under 35 U.S.C. 154(b) by 408 days.

(21) Appl. No.: 13/153,937

(22) Filed: Jun. 6, 2011

(65) Prior Publication Data

US 2011/0297364 A1 Dec. 8, 2011

(30) Foreign Application Priority Data

Jun. 5, 2010 (DE) .......................... 10 2010 022 763

(51) Int. Cl.
*G05D 11/02* (2006.01)

(52) U.S. Cl.
USPC .............. 700/282; 700/19; 700/277; 700/301

(58) Field of Classification Search
USPC ............ 165/281; 700/19, 275, 276, 277, 281, 700/282, 301
See application file for complete search history.

(56) References Cited

U.S. PATENT DOCUMENTS

| 2003/0126913 A1* | 7/2003 | Spengler | 73/49.7 |
| 2004/0000155 A1* | 1/2004 | Cline et al. | 62/175 |

* cited by examiner

*Primary Examiner* — Carlos Ortiz Rodriguez
(74) *Attorney, Agent, or Firm* — Andrew Wilford

(57) ABSTRACT

A heating-cooling system has a plurality of users, a piping system subdivided into a plurality of zones in each of which a respective group of the users is connected in parallel, a heater or cooler having a supply line and a return line connected to the zones, a pump connected to the heater or cooler and to one of the lines for flowing a heat-exchange medium through the respective users, and respective flow-control valves connected in each of the zones for controlling flow of the medium therethrough and establishing in the respective zones a respective differential pressure. Flow in the zones is adjusted by controlling the respective valves to make a detected actual value of the differential pressure in the zone correspond to a set-point value previously detected and stored, with the differential pressure across each of the control valves being similarly feedback controlled.

4 Claims, 3 Drawing Sheets

METHOD OF AUTOMATIC HYDRAULIC EQUALIZATION IN A FLUID-FLOW SYSTEM

FIELD OF THE INVENTION

The present invention relates to a fluid-flow system. More particularly this invention concerns a method of controlling fluid flow in a hydronic heating or cooling system with several zones.

BACKGROUND OF THE INVENTION

A standard hydronic heating or cooling system has at least one heater and/or cooler, a plurality of users, typically radiators, that are parallel-connected in respective zones via a piping system conducting the heat-exchange medium, and at least one recirculation pump, wherein for controlling the differential zone pressure, a flow-control valve provided with an actuator is installed in each of the piping zones.

The heat-exchange medium is a fluid, preferably water. The method can be used for heating and cooling systems comprising at least one heater and/or cooler, a plurality of users, pipelines for the liquid-conducting connection of heater and/or coolers and users, and at least one recirculation pump and zone valves installed in the pipelines.

Due to the constantly increasing demands in terms of energy saving in fluid-conducting systems in buildings such as, for example, heating, cooling and/or sanitary systems, hydraulic conditions are required that are more exact or are adapted to the current energy consumption. The previously used simple static adjustment of the volume flows, for example by zone valves, in systems in which very often changing load states occur are not sufficient anymore. In addition, mainly in old systems, in which often the actual pipe layout is unknown, even an optimal static adjustment is not possible.

OBJECTS OF THE INVENTION

It is therefore an object of the present invention to provide an improved method of automatic hydraulic equalization in a fluid-flow system.

Another object is the provision of such an improved method of automatic hydraulic equalization that overcomes the above-given disadvantages, in particular that, even in case of changing load states of all zones, for example of a heating system, optimizes the fluid-medium supply to the designed state in accordance with the volume flow conditions detected for the designed state.

In particular, it is the object of the invention, even in case of variable, constantly changing volume flow requirements of the users, to prevent by means of an automatic hydraulic calibration, an under-supply or over-supply of the individual piping zones and to maintain the total differential pressure generated by the recirculation pump for supplying the users as low as possible so as to reduce the energy consumption of the entire system.

SUMMARY OF THE INVENTION

A heating-cooling system has a plurality of users, a piping system subdivided into a plurality of zones in each of which a respective group of the users is connected in parallel, a heater or cooler having a supply line and a return line connected to the zones, a pump connected to the heater or cooler and to one of the lines for flowing a heat-exchange medium through the respective users, and respective flow-control valves connected in each of the zones for controlling flow of the medium therethrough and establishing in the respective zones a respective differential pressure. According to the invention the pressure differentials are detected between inlet and outlet sides of each of the valves and respective set-point outputs corresponding thereto are generated, the pressure differential between the supply and return lines is detected and a set-point output corresponding thereto is generated, and all of the outputs are stored. Thereafter the pressure differentials between the inlet and outlet sides of each of the valves are continuously monitored and respective actual-value outputs corresponding thereto are continuously generated while at the same time the pressure differential between the supply and return lines is continuously monitored and an actual-value output corresponding thereto is continuously generated. Each of the actual-value outputs is compared on a running basis with the respective set-point outputs and flow through each of the valves is adjusted by acting on an actuator of each valve so as to bring the respective actual-value output into agreement with the respective set-point value.

According to a further feature of the invention, preferably at the beginning of the second method step, first the flow-control valve in the fluidically least effective piping zone is fully opened and subsequently the other flow-control valves of the other piping zones are adjusted to control the differential pressure in the other piping zones via a computer and set it to the stored target differential pressure.

Also, the computer preferably controls the pump capacity of the recirculation pump parallel to the second method step in such a manner that the least effective piping zone is still supplied with sufficient differential pressure.

In a manner known per se the flow-control valves of the individual users are preset with respect to their flow rate.

Moreover, it is advantageous if the differential zone pressures are turned down in a controlled manner in a setback operating mode.

It is also preferred that the computer is connected to the internet and communicates with computers connected thereto.

The method according to the invention comprises determining the heating/cooling requirement, calculating the radiator/cooling volume flow by means of the heating/cooling requirement and temperature difference, presetting the valves at the user, automatically determining the volume flow in the respective zone, and controlling the differential pressure between supply line and return line. Usually, presettable valves are attached to the users. For space heating, for example, valves with thermostatic heads are typically used. However, the thermostatic heads are installed only after the setting or the setting is carried out with the valve in the open position.

Determining the volume flow in the respective zone is carried out for example in such a manner that the zone valves (flow-control valves) are connected with measuring hoses to the differential pressure sensors. For controlling the differential pressure between the supply line and the return line, the zone valve is fully opened in the least effective zone. By means of the other zone valves of the other zones, the differential pressure in the other zones is controlled and set to the required value. Parallel to this, the pump speed is controlled and set to the required level so that the least effective zone is still supplied with sufficient differential pressure.

According to the invention, the differential pressure required in the individual piping zones and in the entire system is determined in the real system; this means, all resistances within the system are considered. Inaccuracies that could result from a purely computational determination of the system values are thus avoided.

As a result, a permanent, dynamic hydraulic calibration in the system is ensured. This allows a quick response to a change in the energy supply to the users and a hydraulic calibration that is optimal for all operating states and thus, a low energy consumption of the system is ensured. Moreover, due to the controlled differential pressure in the zones, flow noises at the users can be avoided or reduced.

Because during operation, the zone valve installed in the hydraulically least effective zone is fully open and the other zone valves are closed only to an extent that is absolutely necessary, only minor pressure losses are caused by the hydraulic calibration. Accordingly, the recirculation pump can be controlled to run at a low speed and the energy consumption of the system can thus be further reduced.

In case of night setback, the differential pressure in the zones can be controlled and turned down, whereby small amounts of water are recirculated and the energy consumption can be reduced again.

BRIEF DESCRIPTION OF THE DRAWING

The above and other objects, features, and advantages will become more readily apparent from the following description, reference being made to the accompanying drawing in which.

DETAILED DESCRIPTION

Figure 1:
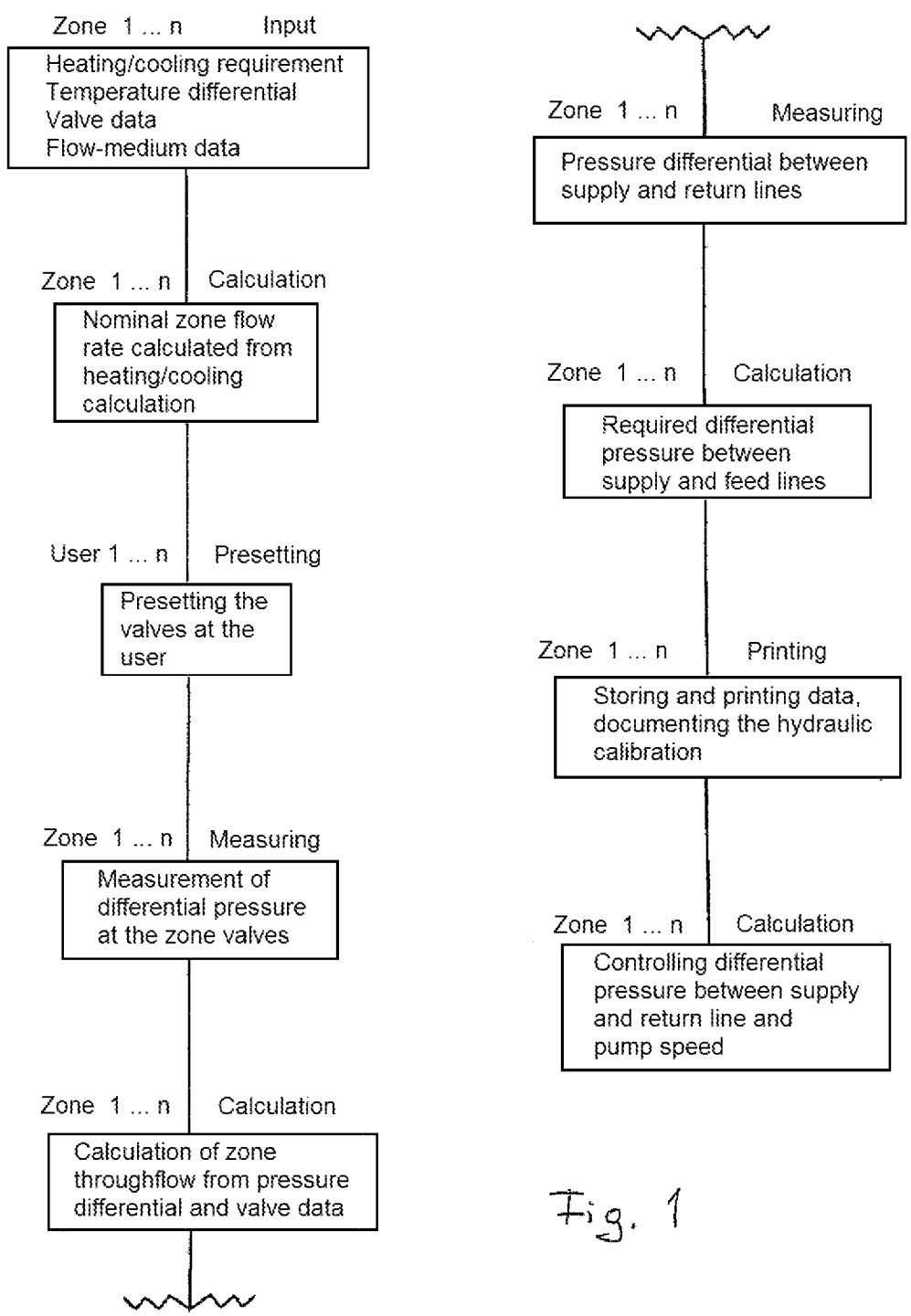
FIG. 1 is a block diagram illustrating the method of this invention.

A shown in FIG. 1, the method according to the invention is first carried out such that the system parameters are entered and imported into a computer and stored therein.

For example, for each zone 1 to n, an input of a heating/cooling requirement, temperature difference, valve data and data of the flow medium is carried out. Subsequently, for each zone 1 to n, the nominal zone flow rate is calculated from the heating/cooling requirement. Furthermore, for each user 1 to n, a presetting takes place, that is the presetting of the valves at the users. Furthermore, for each zone 1 to n, a differential pressure measurement is carried out at the zone valves. Subsequently, a calculation of the zone flow rate from the differential pressure measurement and the valve data takes place. The data are imported into the computer and stored. During the actual permanent dynamic hydraulic calibration of the system, according to FIG. 1, a measurement of the differential pressure between supply line and return line is carried out for each zone 1 to n. The data are imported into the computer and the computer sends permanently actuating commands to the actuators of the flow-control valves. Optionally, the data can be stored and a hard copy of the data can be produced for documenting the actual hydraulic calibration. Moreover, by means of the computer, the differential pressure between supply line and return line can be used as control variable for the pump capacity of the recirculation pump so that the recirculation pump can also be adapted and controlled.

Figure 2:
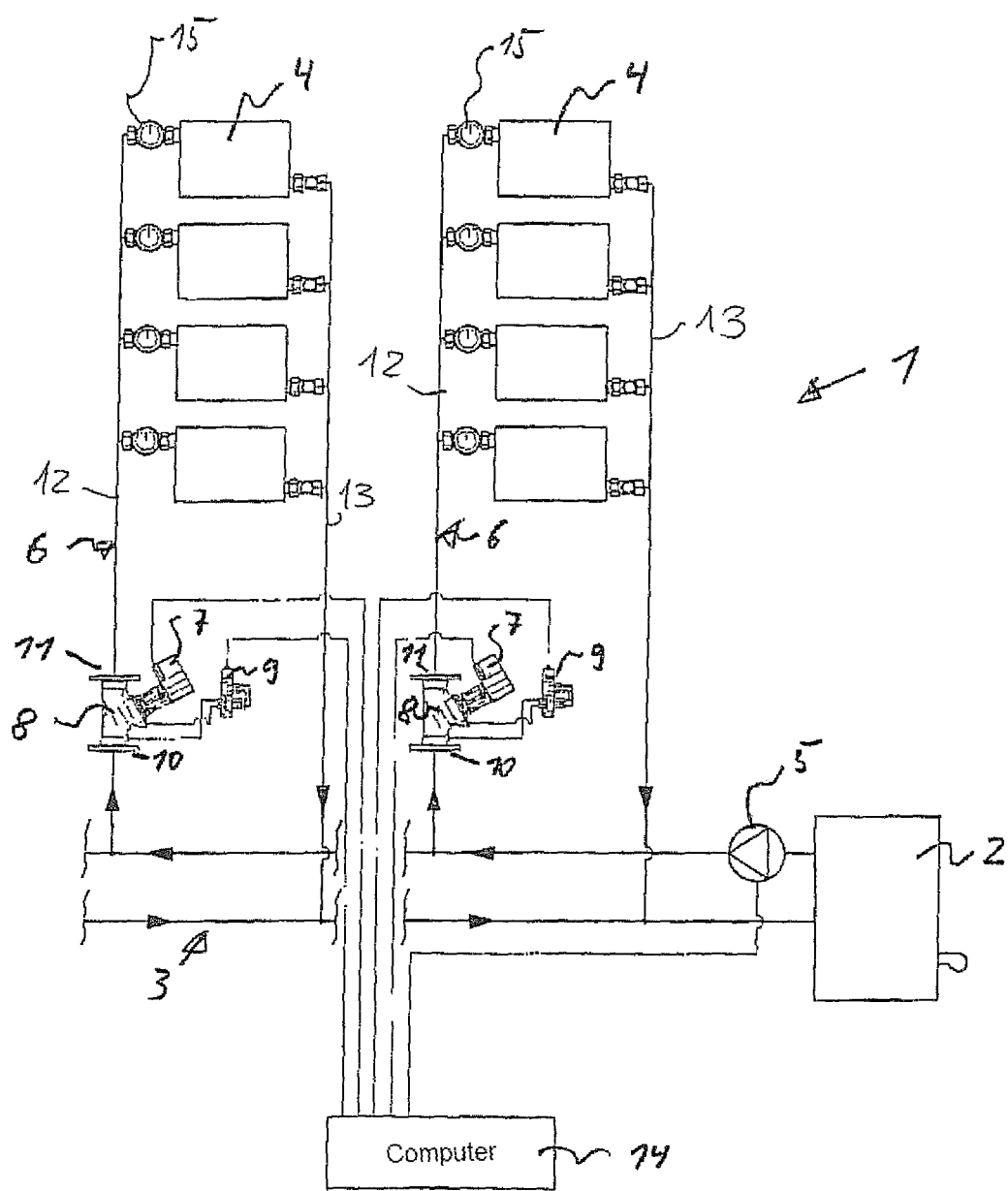
FIG. 2 is a schematic diagram showing a system for determining the system parameters, that is the first step of the invention.

FIG. 2 shows a basic system layout. A heat-exchange medium, for instance water, flows through a heating or cooling system 1. The system comprises, among other things, a heater or cooler 2 and a plurality of users 4 parallel-connected in respective zones thereto via a fluid-conducting piping system 3, a respective recirculation pump 5 as well as flow-control valves 8 with actuators 7 provided in the piping zones 6 for controlling the respective differential zone pressures. Each flow-control valve 8 has an inlet 10 and an outlet 11. Each zone 6 has a supply line 12 and a return line 13. In addition, a computer 14 is provided that communicates with the differential pressure sensors 9 assigned to each flow-control valve 8 and also communicates with the actuators 7 of the zone valves as well as with the recirculation pump 5.

For carrying out the method according to the invention, each differential pressure sensor 9 first records the differential pressure between the inlet side 10 and outlet side 11 of the respective flow-control valve 8 and subsequently the differential zone pressures between the supply line 12 and the return line 13. These data are transmitted to the computer 14, that is imported into and stored in it.

Figure 3:
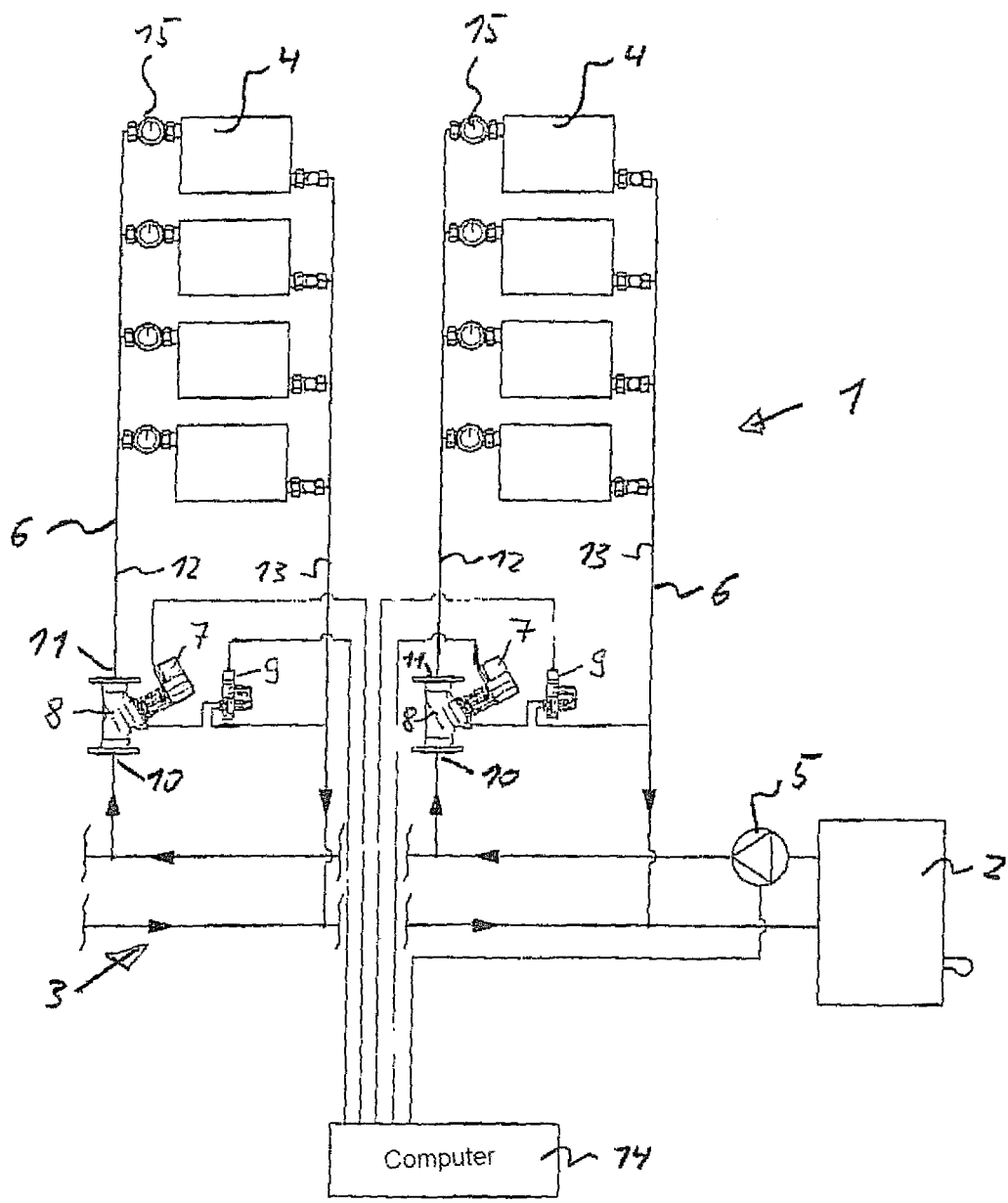
FIG. 3 is a schematic diagram showing a system for carrying out the automatic hydraulic calibration according to the second step of the invention.

As illustrated in particular in FIG. 3, the computer 14 in turn sends actuating commands to the actuators 7 of the zone valves 8, the zone valve 8 of at least one zone 6 being operated in the open position (preferably in the least effective zone) and the differential zone pressures in all zones 6 are controlled and set by the other flow-control valves of the other zones 6 to the required value.

Parallel to this, the computer 14 controls the pump speed and thus the pump capacity so that in each case the worst zone 6 is still supplied with sufficient differential pressure.

Preferably, the differential zone pressures are controlled and turned down in the setback operating mode. For this purpose, the computer can be programmed accordingly.

The computer 14 can also be connected to the internet and communicate with computers connected thereto.

With the method according to the invention it is possible to realistically determine the differential pressure in an existing system, all resistances of the system being considered and inaccuracies that could result from a purely computational determination being avoided. As a result, a permanent dynamic hydraulic calibration is achieved.

The invention is not limited to the illustrated embodiment but is highly variable within the context of the disclosure.

All novel individual features and combined features disclosed in the description and/or the drawing are considered to be essential for the invention.

I claim:

1. A method of hydraulically calibrating a heating/cooling system having:
   a plurality of users;
   a piping system subdivided into a plurality of areas in a building in each of which a respective group of the users is connected in parallel;
   a heater or cooler having a supply line and a return line connected to all of the areas;
   a pump connected to the heater or cooler and to one of the lines for flowing a heat-exchange medium through all of the users; and
   respective flow-control valves connected in each of the areas for controlling flow of the medium therethrough and establishing in the respective areas a respective differential pressure,
   the method comprising the steps of:
   detecting the pressure differentials between inlet and outlet sides of each of the valves and generating respective set-point outputs corresponding thereto;
   detecting the pressure differential between the supply and return lines and generating a set-point output corresponding thereto;

storing all of the outputs; and thereafter continuously monitoring the pressure differentials between the inlet and outlet sides of each of the valves and generating respective actual-value outputs corresponding thereto;

fully opening the valve of the fluidically least efficient area, thereafter only adjusting flow in the other valves, and thereafter continuously monitoring the pressure differential between the supply and return lines and generating an actual-value output corresponding thereto and operating the pump while adjusting the valves in such a manner that the least effective area is supplied with sufficient differential pressure; and continuously comparing each of the actual-value outputs with the respective set-point outputs and adjusting flow through each of the valves so as to bring the respective actual-value output into agreement with the respective set-point value.

2. The calibration method defined in claim 1, further comprising before detecting the differential pressures, the step of:

presetting the flow rates of the valves.

3. The calibration method defined in claim 1, further comprising the step of reducing the differential pressures in the valves in a setback operating mode.

4. The calibration method defined in claim 1, wherein the outputs are stored in and controlled with a computer, the method further comprising the step of:

connecting the computer to the internet and communicating therethrough with other computers connected to the internet.

* * * * *